US 6,401,134 B1
Jun. 4, 2002

(12) United States Patent
Razavi et al.

(54) DETACHABLE JAVA APPLETS

(75) Inventors: Behfar Razavi, San Jose; Eric Harshbarger, San Francisco, both of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/910,481

(22) Filed: Jul. 25, 1997

(51) Int. Cl.$^7$ ................................................. G06F 9/54
(52) U.S. Cl. ...................................... 709/310; 345/808
(58) Field of Search ................................ 345/326–357, 345/163, 700, 764, 804, 808; 709/200, 310–332; 707/513

(56) References Cited

U.S. PATENT DOCUMENTS

| | | | | |
|---|---|---|---|---|
| 4,931,783 A | * | 6/1990 | Atkinson | 345/163 |
| 5,742,768 A | * | 4/1998 | Gennaro et al. | 709/200 |
| 5,802,530 A | * | 9/1998 | Van Hoff | 707/513 |
| 5,818,445 A | * | 10/1998 | Sanderson et al. | 345/334 |
| 5,870,091 A | * | 2/1999 | Lazarony et al. | 345/346 |
| 5,923,326 A | * | 7/1999 | Bittinger et al. | 345/340 |

OTHER PUBLICATIONS

David Mitchell, :Leveraging your Visual C++ experience on the Internet with thin client technology, Microsoft Systems Journal, v11,n12,p47(13), 12/96.*
Lisa Nadile, "Microsoft expanding OCX: readies detachable, embeddable applets for the Internet", PC Week, v13, n8, p6(1) 2/96.*
Jugel et al; "The Java Telnet applet: documentation", 1996.*
Morrison et al, Java Unleashed, 12/96.*
Afergan et al., Web programming desktop reference, chap. 14, 1996.*
Gosling et al, Java API documentation, version 1.0.2, 1996.*
Jamie Jaworski, JAVA Developer Guide, chapters 1,15,16, 19,31, and appendix, 1996.*
Warth et al, User's guide to JDK (beta 1.0): applet; Oct. 24, 1995.*
author unknown, Java API documentation, Feb. 22, 1996.*

* cited by examiner

*Primary Examiner*—Dung C. Dinh
(74) *Attorney, Agent, or Firm*—Blakely Sokoloff Taylor & Zafman

(57) ABSTRACT

A method and system is disclosed for detaching Java applets from the constraints of the application such as a browser which provides the Java engine for executing those applets. Thus, the applets, when detached, can appear in a detached window which is more easily controllable by the operating environment desktop. The Java applets continue to run under the application's virtual machine but do so without regard to the graphical interface limits of the application. Further, if the application that launched the applet proceeds to a new URL location, the Java applet continues to run. Also, the applet, once detached, can be reattached into the application to appear in the application history.

20 Claims, 7 Drawing Sheets

DETACHABLE JAVA APPLETS

BACKGROUND OF THE INVENTION

1. Field of the Invention

The present invention relates to the field of computer software. More specifically, the present invention relates to applets and their relationship to an operating environment.

2. Description of Related Art

Recent versions of applications such as browsers like Netscape Navigator 3.0™ or Hot Java™ (a product of Sun Microsystems, the Sun logo and Hot Java are trademarks or registered trademarks of Sun Microsystems in the United States and other countries) have provided for the use of platform-independent "applets" which can be downloaded as pre-compiled Java byte-codes (intermediate level instructions). These applets are executed via a "virtual machine," which is a platform-specific environment that interprets or compiles the applet code and performs the high-level instructions therein. One popular and predominant applet programming language, developed by Sun Microsystems, Inc., is known as "Java™" (a product of Sun Microsystems, the Sun logo and Java are trademarks or registered trademarks of Sun Microsystems in the United States and other countries). Applets programmed in Java or minor variations thereof are referred to as Java applets.

The key usefulness of Java applets is that they are platform-independent, i.e., a Java applet written for platform A will run without modification on platform B provided that both platform A and platform B have virtual machines capable of executing applet code for their respective platforms. Even though Java applets are platform-independent, the characteristics, quirks and limitations of the applications from which they are spawned weaken the flexibility by causing the applets to become essentially "application-dependent." For example, one limitation of Java applets when called from HTML (Hypertext Markup Language) code for the Sun operating system version of Netscape Navigator is that when applets are called, the HTML tag for the call must include a height and width, thus defining a window size that the applet must execute within. When running inside the application window, the applet is constrained by the stated height and width tag and thus, any output, input, dialog boxes or pop-up windows that are generated for the applet must appear within that constraint.

In this situation, where the applet window is a "sub-window" of the application window, the applet window suffers several impediments. First, the applet window cannot be closed unless the application is quit or until the application transitions to receive data from a new host (in the same window that launched (spawned) the applet). And concomitant with that limitation, when the application that spawned the applet transitions to a new URL (Uniform Resource Locator—the "address" of the host visited by the application) then the applet window closes and the applet ceases execution. The cessation of the applet is out of the control of the user. In certain instances, it is desirable to continue running the applet even though the application has transitioned to a different URL. For instance, a user may desire a streaming audio applet that plays content from an external or remote source which is launched from URL A to continue playing even though the application has proceeded to URL B, which does not have the same applet. Under current practice, it would be necessary to open or spawn a new instance of the application (i.e., open a new application window) to receive its content from URL B so that the other application instance continues to play the audio applet. But this approach suffers from several maladies.

First, launching a new application instance may involve an increase in memory and system resource utilization which will diminish the performance of both the applet and the new application instance. Further, the applet still cannot be controlled outside of the constraints or environment of the application. In fact, with a second application window (instance) launched, the first window must become active (in the foreground, under control of cursor or mouse) before the applet can be controlled. Further, the traditional applet model does not allow for iconification of the applet window within the operating environment (minimizing of the window). Under current practice, the application window itself must be minimized in order to minimize and iconify the applet. In that case, the applet rather than having its own icon, will the inherit the icon of the browser. The lack of window minimization, resizing and other GUI modification such as changing fonts, backgrounds colors, etc., imposes severe constraints on the applet to be independently controlled without application constraints.

One solution to remove the application dependence of executable code modules has been the use of "plug-ins". However, unlike "plug-ins" (file(s) containing data/code used to alter, enhance, or extend the operation of a parent application) that are operating environment/platform specific, Java applets are essentially platform independent. Plug-ins, which must be downloaded (or come packaged with the application), allow certain file types (such as Shockwave™ or RealAudio™) which may not be supported internally by the application to be interpreted and output on the local platform. However, plug-ins are disadvantageous in that they remain resident locally and must be stored on local disk for re-use, unlike the virtual machine of Java which is application resident. Importantly, plug-ins spawn processes wholly independent of the browser and are thus, platform dependent. Thus, though plug-ins may allow for independent GUI control of their windows, they are completely disinherited from the browser unlike Java applets (because they do not require a virtual machine to run). Running a plug-in is akin to running a separate application via the operating environment, and thus is not a viable substitute for portable executability as is a Java applet.

Yet another development for enhancing capabilities of an application such as a browser is the use of "helper" applications. Helper applications, which are stored locally, do not have the portability and platform independence of Java applets, i.e., a helper application on a Pentium platform cannot be used on a Sun Sparc™ (a product of Sun Microsystems, the Sun logo and Sparc are trademarks or registered trademarks of Sun Microsystems in the United States and other countries) system or vice-versa. The helper application also spawns a new process/thread within the operating environment and commands the system resources of a new application instance which is unlike Java applets. The helper application is not related to the application delivering the data to be processed and is merely called through the operating environment. The helper application does not plug-in or execute within a virtual machine of the application. Further, a helper application is not easily transferred from host to client, since helper applications can be quite large in code size when compared to applets.

Further, on newer information devices such as network computers (NCs), helper applications and plug-ins may not even work due to limited operating environment features and lack of local storage. NCs are conceptually based on utilizing remotely stored applets, such as Java applets which are network distributed, to provide applications and content to the NC. In contrast, the current industry standard for NCs guarantees that NCs are able to execute Java applets, through the use of virtual machine and browser/application. Even in the NC situation, it is desirable that the applet have its own built-in functionality separate from the browser/application from which it is called.

Thus, there is a need for a method and apparatus to detach Java applets from the constraints of the application so that they can be GUI-controlled directly through the operating environment and so that they not be limited by the state of the application in which the applets are spawned.

SUMMARY

A method and system is disclosed for detaching Java applets from the constraints of the application which provides the Java virtual machine for executing those applets. Thus, the applets, when detached, can appear in a detached window which is more easily controllable by the operating environment desktop. The Java applets continue to run under the application's virtual machine but do so with less constraints than the graphical interface limits of the application. Further, if the application that launched the applet transitions to a new URL host, the Java applet continues to run. Also, the applet, once detached, can be reattached into the application to appear in an application history.

DETAILED DESCRIPTION OF THE INVENTION

Definitions

The word "operating environment" refers to an operating system, kernel, shell, or the like which is low-level software which schedules tasks, allocates storage, handles the interface to peripheral hardware and presents a default interface to the user when no application program is running. The operating environment also allows application programs to run by performing storage allocation, input/output, etc., that the application may request through its executable code.

The word "desktop" refers to the visual environment (usually output on a display screen) wherein the operating environment allows a user to interact with the operating environment. A desktop includes but is not limited to the display and use of icons, cursors, windows, dialog boxes, menus and other user interface elements which are a function of the operating environment. The desktop is a visually rendered screen region wherein application windows and their associated input/output may be displayed and interacted upon by a user, if desired.

A "method" as used in the detailed description refers to a function call, procedure or routine associated with one or more classes, which are well-known in the art of object-oriented programming.

The word "detachable" refers to the ability of an applet to become free of GUI constraints imposed upon it by the application that spawned the applet. "Detachability" implies that the applet is capable of being manipulated in a graphical user interface sense separate of the application that spawned it and can instead be manipulated on the desktop by interaction directly with the operating environment.

The word "virtual machine" refers to an interpreter, compiler, linker, etc., which is included in an application or operating environment to facilitate the execution of instructions, pseudo-code and the like for a particular programming language such as Java.

Figure 1:
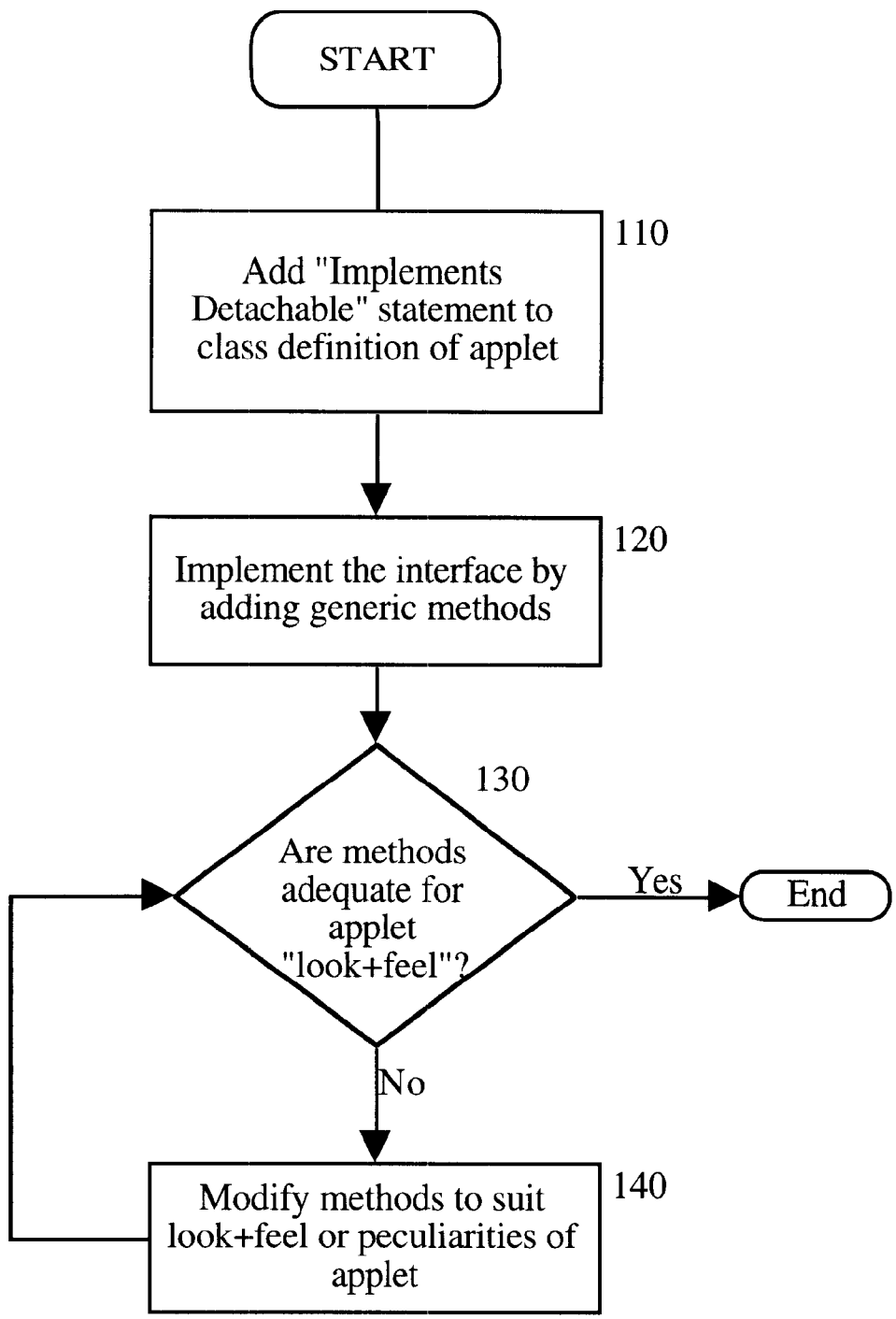
FIG. 1 is a flow diagram of transforming a non-detachable Java applet to have the functionality of detachability according to an embodiment of the invention.

FIG. 1 is a flow diagram of transforming a non-detachable Java applet to have the functionality of detachability according to an embodiment of the invention.

Any pre-existing Java applet can be modified to become a detachable Java applet as detachable is described with respect to various embodiments of the invention. When an applet is defined/created, its source code can be modified to include methods for detaching the applet. The first step is to add an "implements Detachable" statement to the class definition of the applet (step 110). This implements an interface called "Detachable". Appendix A, the Java source code for the Jukebox streaming audio applet, shows on column 2, the class definition "public class Jukebox extends Applet implements Detachable." The phrase "public class <Applet Name> extends Applet" is shared by all applets in their main class definition. The phrase "implements Detachable" may then be appended to any such definition to begin the modification of the <Applet Name> applet to become detachable. Several more steps are desirable in order to complete the foundation for detachability of the applet. The Detachable interface invoked via the class definition is implemented by adding several generic "methods" (see Definitions, above) to the source code of the applet (step 120). The methods while generic in terms of the Detachable Interface are peculiar and unique to this embodiment of the invention in that these methods have not been previously defined in the art of Java development.

The generic methods will allow a Java applet to become detachable from the application in which they were spawned and will allow the applet to have the functionality of any ordinary application window running on the operating environment (e.g., Solaris™, a product of Sun Microsystems, Solaris is a trademark or registered trademark of Sun Microsystems in the U.S. and foreign countries) desktop. The generic methods, if they are not adequate for that specific applet's look-and-feel (checked at step 130), may be modified. The generic methods can be modified to include interfacing that suits the look-and-feel or peculiarities of the applet (step 140). For example, it may be desired in a detachable "chat" (text-based conversation between users) applet that the chat window resize itself to display long strings of text which without resizing itself were invisible. The methods, which are defined below may be modified by one of ordinary skill in the art to suit the applet being transformed into a detachable applet. One such modification, described below, is the addition of "controller" methods. As described with respect to step 120, these generic methods are added to the exemplary Jukebox applet code disclosed in Appendix A.

Generic Detachable Interface Methods and Modifications Thereto

1. "Detach" (illustrated as "public void detach ( ) {" in Appendix A).

The Detach method is the primary function call allowing the applet to be detached from the application. The state variable "isDetached" is set equal to true to indicate the applet is now in the detached as opposed to attached state. The statement "remove(UIpanel)" is responsible for removing the "panel" for the user interface which contains components like user interface elements (i.e., buttons, text boxes, menus, icons, etc.). The panel UIpanel is removed and passed onto the "Detached Frame" class that is instantiated. The "Detached Frame" class is a platform-independent implementation based on the standard Java virtual machine and is thus available to all Java platforms. Code for the Detached Frame class is shown in Appendix B. The Detached Frame is instantiated to create a detached window (application independent applet window) into which UIpanel components (user interface elements) can be rendered. The statement "controller.makeAttachable( )," is an example of a modification of the generic Detach method that is specific to the Jukebox applet that creates a user interface element for attaching the applet back to the application.

2. "Attach" (illustrated as "public void attach ( ) {" in Appendix A)

The Attach method is used to re-attach the applet back to the application and to close the detached window residing outside of the application's window. The state of the applet is returned to attached by setting isDetached equal to false. Next, the Detached Frame object is disposed of. The UIpanel components are then added back to the application (add (UIpanel) statement). An example of applet-specific (in this case, the Jukebox applet) modification to the generic method Attach is the controller.makeDetachable statement which when included provides user interface elements for detaching out the applet.

3. Close (illustrated as "public void close( )" in Appendix A)

The Close method kills the Detached Frame window and typically, the applet does not thereafter re-attach to the application. This method is useful when total purging of the applet is desired.

These generic methods, when added to implement the Detachable interface, will cause a non-detachable applet to become detachable (have the functionality of detaching from the application window).

Figure 2:
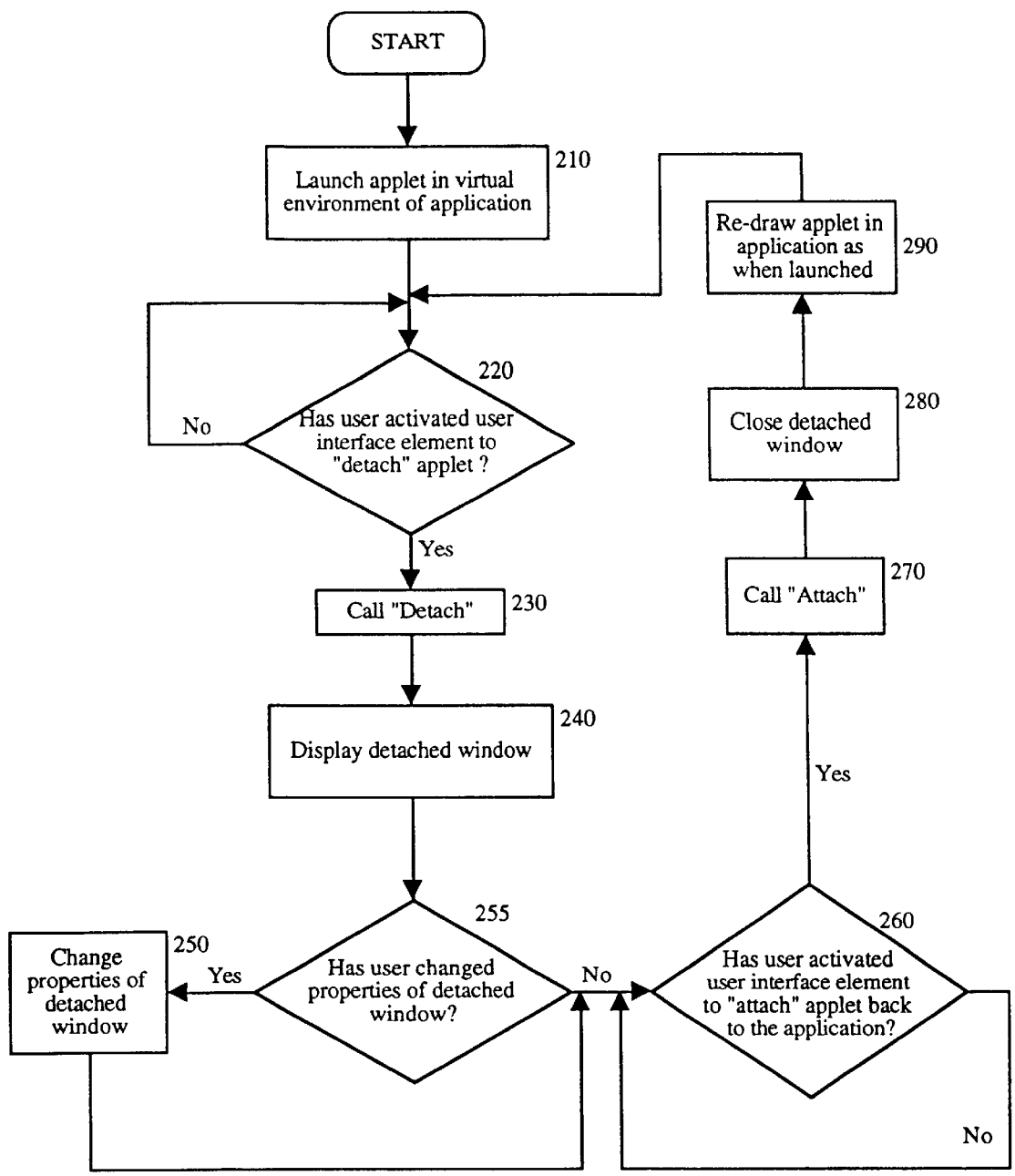
FIG. 2 illustrates a flow diagram of applet behavior when launched from an application according to an embodiment of the invention.

FIG. 2 illustrates a flow diagram of applet behavior when launched from an application according to an embodiment of the invention.

Though FIG. 2 is directed toward detaching from a application, the methodology is equally applicable to detaching applets from any environment that executes the applet code through a virtual machine.

According to step 210, first, the applet must be launched in the virtual machine of the application. This is usually accomplished automatically when a user visit a web site (HTML page) which includes statement for launching the applet. Assuming that the applet has been transformed according to the methodology of FIG. 1, or if the applet is already capable of detaching, the virtual machine is checking (waiting) for the user to activate the user element, such as a button, to detach the applet from the application (checked at step 220). If the user has activated the "detach" user interface element, then the environment calls the "Detach" method (step 230).

The calling of the "Detach" method, for example, leads to the execution of other instructions as mentioned above. One key result of these instructions is the displaying of a detached window in which the applet controls and perhaps, data would be rendered on to (step 240). Two checks are continuously being performed once the display has rendered the detached window. The first is to see whether the user changed properties (such as size, background color, etc.) of the detached window (step 255). This step is a check performed not from the application, but from the operating environment itself. If any changes are requested of the properties of the detached window, the operating environment initiates and completes those changed properties (step 250). Such changes include resizing the detaching window, changing the fonts of the window, and since the detached window is a window of the operating environment, minimizing and iconification can be performed without reference, modification of the application window. Further, the applet in the detached window is no longer application constrained, and has its own set of graphical properties—color, background, font, size, etc.—apart from the application. The desktop can control the look-and-feel of the detached window, and consequently, to some degree, the applet as well.

The second check being performed is to query if the user activated the user interface element to attach the applet back to application (step 260). Once the applet is in the Detached Frame, the user interface element (button, etc.) for detaching will be replaced by a user interface element for attaching the applet back to the application. A request by the user to attach the applet to the application will first cause the "Attach" method to be called (step 270). The Attach method includes several instructions as described above but has the primary functionality of closing the detached window (step 280) and removing it from the operating environment. The applet is then redrawn into the application window as when the applet was launched maintaining not the detached look-and-feel, but reverting to the look-and-feel of the application which launched the applet. The applet, when redrawn into the application will replace the user interface element for attach with the user interface element for detach. Thus, the applet can switch states from attached to detached as the user so desires. Not shown in FIG. 2 is the case where the application has transitioned to a new host prior to the applet being attached. In that case, the applet, rather than being redrawn in the application window, becomes part of the application's "history". The history is a record of previously visited URLs so that users of the application can return to those URL sites again.

Figure 3:
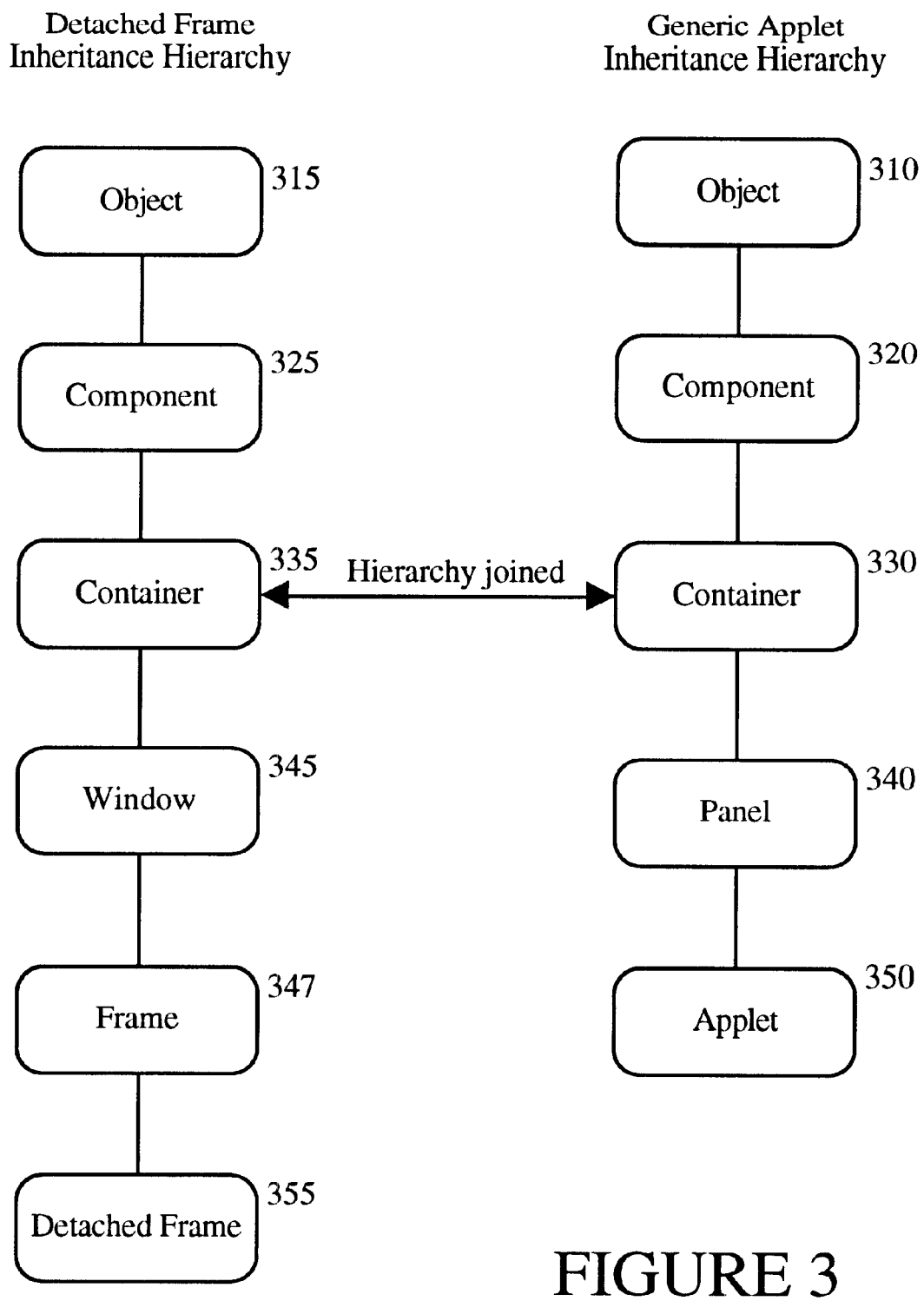
FIG. 3 is a diagram of exemplary inheritance hierarchy as defined for Java applets.

FIG. 3 is a diagram of exemplary inheritance hierarchy as defined for Java applets.

From object or class inheritance viewpoint, there are two sets of inheritance trees for the various embodiments of the invention. The first, shown on the right-hand side of FIG. 3 is the generic Java applet inheritance hierarchy. An Object 310 is inherited into a Component 320. The Component 320 (and consequently Object 310) is inherited into Container 330. Container 330 is inherited into Panel 340. Finally, Panel 340 is inherited into Applet 350.

The second hierarchy shown in FIG. 3 is the hierarchy created by inheritance of the Detached Frame. This hierarchy is a representation of the methodology of detaching an applet described with respect to various embodiments of the invention.

Like the generic applet inheritance hierarchy, the left side of FIG. 3, the Detached Frame inheritance hierarchy shows an Object 315 inherited into a Component 325. A Container 335 is, likewise, inherited into a Container 335. FIG. 3 shows that the two hierarchies are identical up to and including the Container object. Thus, the hierarchies may be joined at Containers 335 and 330. The joining of the inheritance hierarchy is conceptually the object-oriented mechanism allowing an Applet 350 to be transferred from the application window to the detached frame since both are instances of class container. One skilled in the art of object-oriented programming will readily be able to utilize the property of joined object hierarchies described above to implement the various embodiments of the invention.

Figure 4:
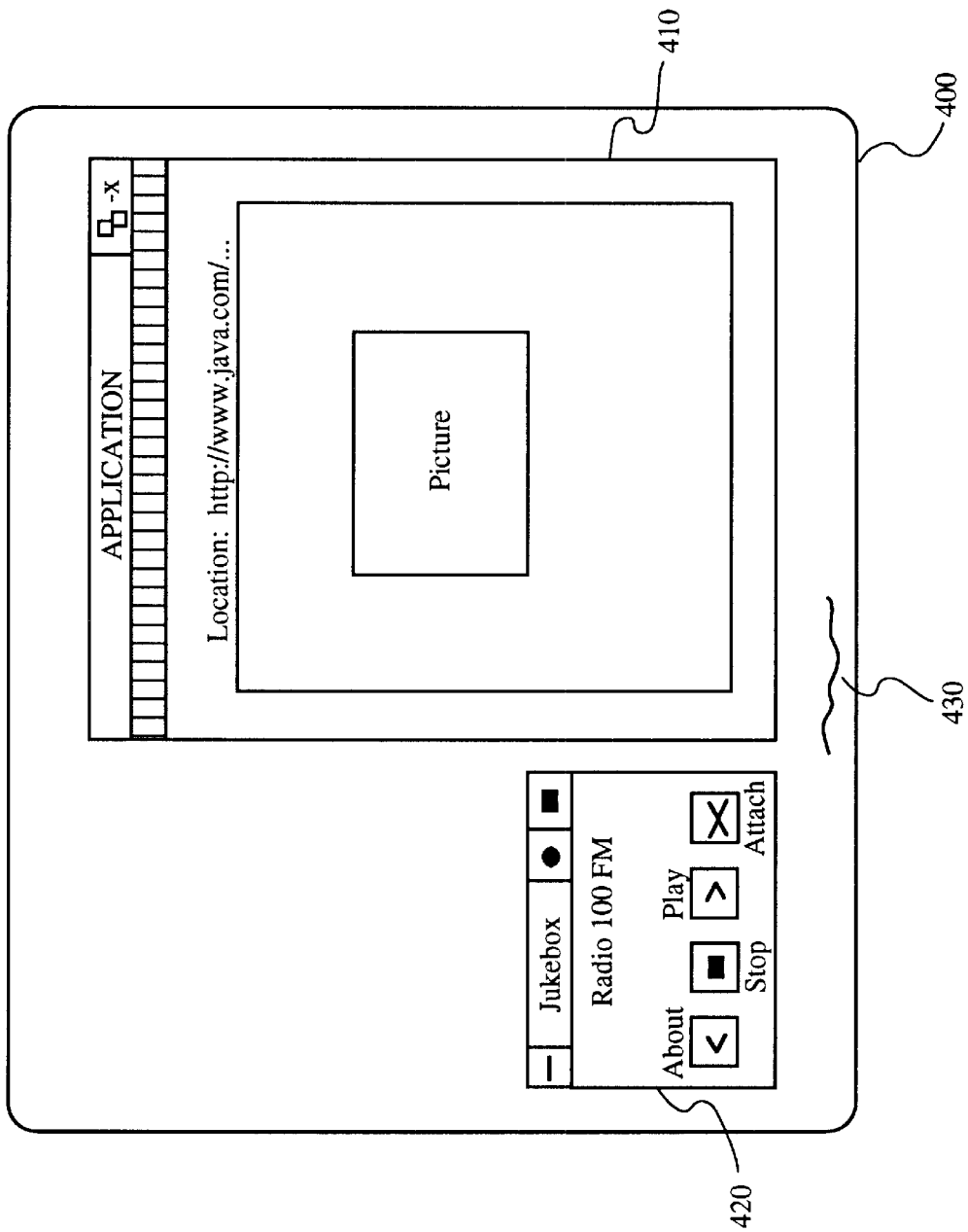
FIG. 4 is an illustration of a resulting detached applet as rendered on a display screen.

FIG. 4 is an illustration of a resulting detached applet as rendered on a display screen.

FIG. 4 shows a display 400 which may any monitor, display or other visual device that renders a application window 410 through the operating environment. Application window 410 is shown as an application window which contains several elements such as a picture and URL (Uniform Resource Location) (labeled as "location"), but may be any window or display environment running over the operating environment. Display 400 shows the application window 410 running over an operating environment desktop 430 (see above for definition of "desktop"). The operating environment desktop 430 and application window 410 may be more intimately or tightly integrated such as in Hot Java Views™ (a product of Sun Microsystems, the Sun logo and Hot Java views are trademarks or registered trademarks of Sun Microsystems in the United States and other countries). The invention can be modified as to remove any lingering visual and user interface constraints of the application window which may restrain an applet however tightly integrated the application and environment may seem. In this sense, FIG. 4 shows an applet named "Jukebox" in a detached window 420. The applet was launched at some URL location and initially, contained within application window 410 (see FIG. 5). FIG. 4 shows the detached state of the applet Jukebox.

In this detached state, the applet controls "About", "Stop" and "Play" are rendered into the detached window. An important aspect to the invention is the ability of the applet to continue running or executing its instructions under the virtual machine (interpreter) of the application whose window is rendered in 410. The operating environment and its desktop 430 now controls the general look-and-feel of the window for the applet Jukebox. The detached window can then be manipulated like any other window on the desktop. The application window 410 and the interface properties of the application no longer control, constrain or limit the GUI characteristics of the applet. Further, when the application window 410 transitions to a new host URL, the applet continues to run in the Detached Frame. Though the virtual machine is platform-dependent, i.e., it must decompose Java code into processor/platform native code, the Java applet and its code is not. When the application closes all of its windows completely, the detached applet is closed as it should be. Further, the applet, even though detached, must cease execution because it is no longer streaming data from the host that was contacted by the application. Thus, the application retains control of concurrently terminating the applet when terminating itself even though the applet is detached from its windowing and interface constraints of the application window.

While in the detached state, several other GUI modifications are available to the detached window which are not explicitly illustrated. First, unlike traditional applets, a detached window 420 can be iconified onto an area of the desktop 430 or minimized into a toolbar or other GUI element without having to iconify the application window 410 as well. Thus, the minimized applet can have its own icon. Further, the detached window 420 may be resized on the desktop 430 while in the detached state without reference to the height-width tag within the HTML (Hypertext Markup Language) or other document which specified the calling of the applet from within the application window 410. This allows the detached applet greater flexibility in its appearance than the non-detachable applet. Further modifications such as a change of font type, font size, color, background, etc., that are available to other windows running on desktop 430 are also available for the detached window 420 and the applet it displays.

Figure 5:
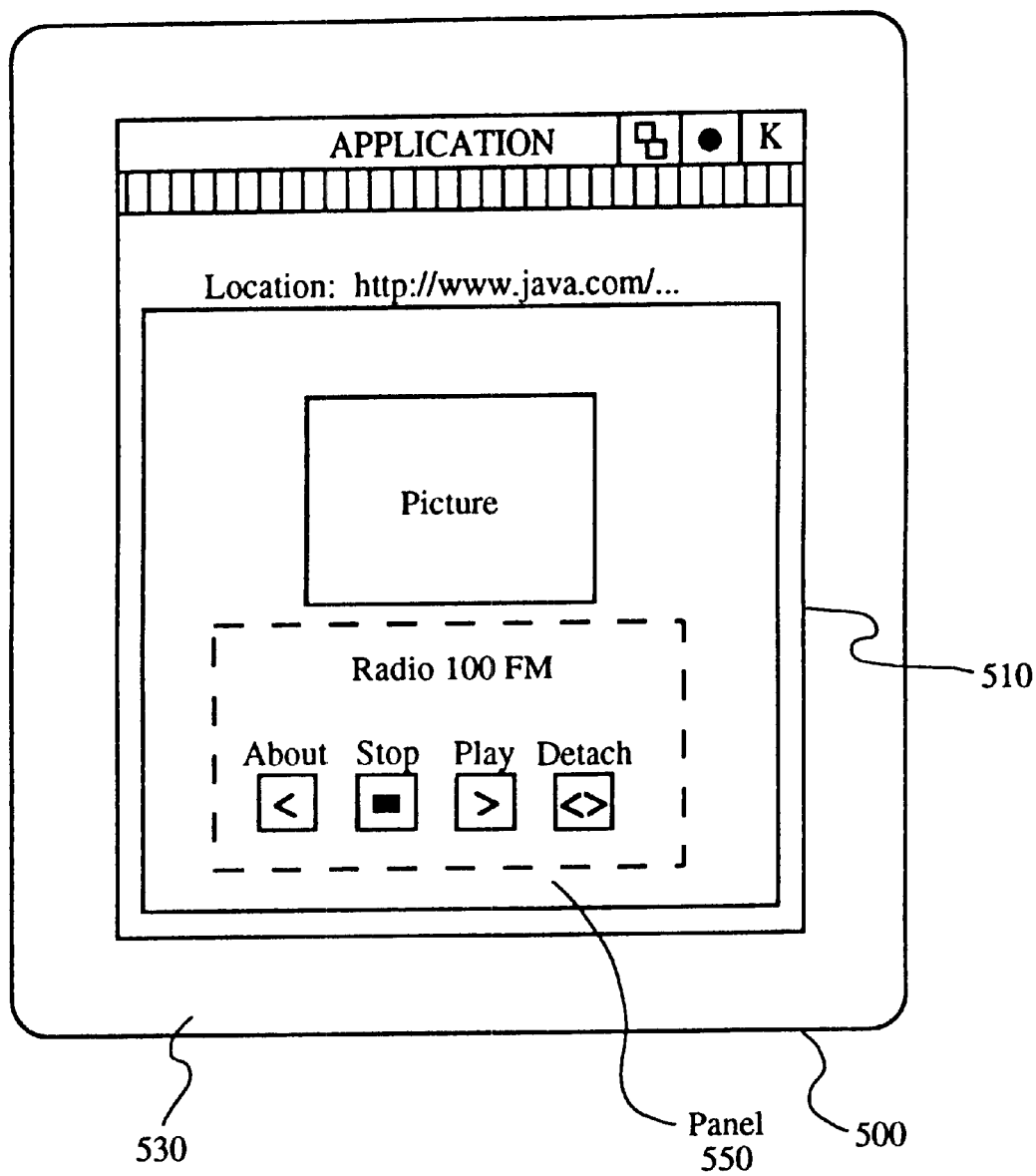
FIG. 5 shows an applet "Jukebox" in the attached state.

The detached window 420 contains, in addition to applet control for the Jukebox, a "control" (a user interface element) is rendered called "Attach" which, when activated, will close the detached window 420 and collapse the applet back into application window 410. This "Attached" state is shown in FIG. 5. If application window had transitioned to a new host URL, then the applet is included in the application history instead of being instantly executed in the application window.

FIG. 5 shows an applet "Jukebox" in the attached state.

FIG. 5 also has a display device 500, an operating environment desktop 530 and a application window 510. When an applet is in the attached state, the application window 410 constrains it. However, if the applet has been made detachable, a "detach" control (button) is rendered into the application window in the panel of the applet so that the attached state may be modified to the detached state leading to a detached window as shown in FIG. 4. Alternatively, the applet can be launched automatically into the detached state with a control for attaching as shown in FIG. 4. A "toggle" method can also be provided to toggle the state of the applet regardless of what the current state is. The toggle can be initiated by a user interface element in both the detached window when the applet is in the detached state and the applet panel (in the application window) when the applet is in the attached state. The toggle method may be desirable where a uniform control is desired in both attached and detached states. The attached state shown in FIG. 5 is unlike the prior art since the applet shown is "detachable" via the "detach control." An applet without detachability would be limited to the application itself and users would be usable to change the display properties of the applet Panel 550 in the application window 510. A detachable applet in the attached state suffers the same limitation, but can be freed by activating "Detach." The attached applet state of FIG. 5 assures that prior to being re-attached from a "detached" state (shown in FIG. 4), the host URL of the application window 510 had not changed.

Figure 6:
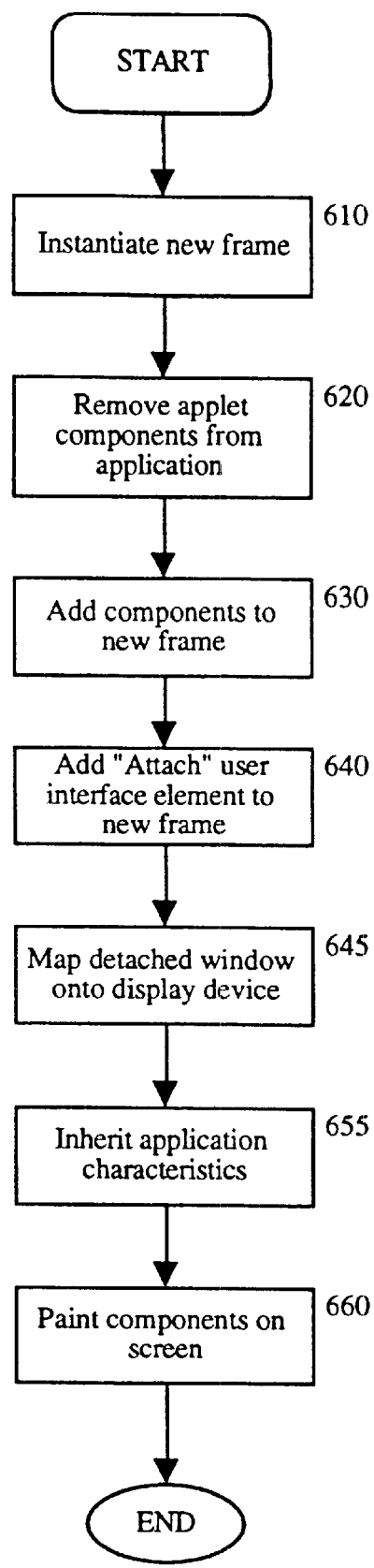
FIG. 6 is a flow diagram of the detaching of an applet according to one embodiment of the invention.

FIG. 6 is a flow diagram of the detaching of an applet according to one embodiment of the invention.

The method definition of "Detach" described above with respect to code Appendix A is not fully represented in FIG. 6 but it will be understood by one skilled in the art that any additional steps shown or omitted from the method definition can easily be implemented.

The first step in detaching is to instantiate a new frame called Detached Frame (see FIG. 1 description of Detach method) (step 610). The new frame is then used as a drop-off point for applet data, content and user interface elements/controls. Next, the applet components are removed from the application applet panel (step 620). These components are objects including, but not limited to, buttons, controls, user interface elements, action messages, dialog boxes, data, etc., which may be renderable to the display device. The applet components are then added to the user interface of the new frame (step 630). Additionally, an "attach" user interface element is added to the new frame in addition to other components so that the applet may re-attach to the application (step 640). Next, the detached window generated through the new frame is mapped or rendered on the display device (step 645). The detached window is, at this stage of the process, a blank window capable of interfacing within the desktop environment of the operating environment. As implemented in various embodiments of the invention, the detached window will inherit size, font, color characteristics of the applet panel as attached in the application window (step 655). Finally, the components, including the attach control, are painted on the screen using the "Paint All" Java method (step 660). The "Paint All" method, well-known in the art of Java programming, is used to render objects to the display or operating environment, rather than within a portion of the application window. This ensures that components for the detached applet will be properly rendered, i.e., without showing up as meshed with other screen graphics or as hidden from view.

Figure 7:
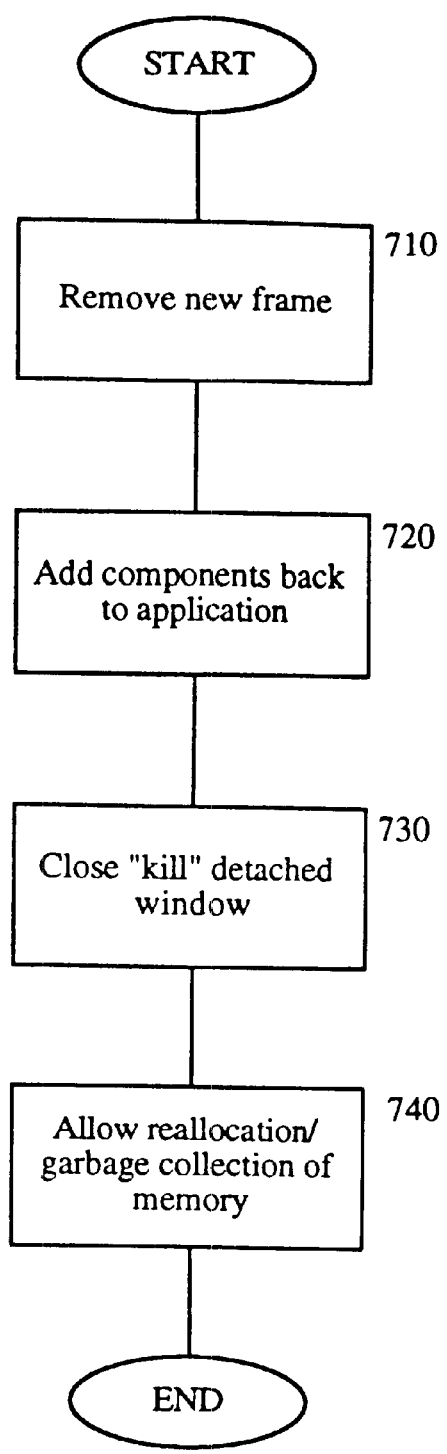
FIG. 7 is a flow diagram of the attaching of an applet according to one embodiment of the invention.

FIG. 7 is a flow diagram of the attaching of an applet according to one embodiment of the invention.

Again, though the flow diagram of FIG. 7 may vary from the method "Attach" described earlier, one skilled in the art will readily be able to exchange/add features of that method into the flow diagram of FIG. 7 and vice-versa.

When the attach control is activated, first the new frame instantiated by the calling of the Detach method is disposed from the virtual machine environment (step 710). Components which were removed from the application environment are added back to the application, and automatically rendered in a panel therein as with a typical Java applet (step 720). Next, the detached window is closed (step 730) or removed from the operating environment. Finally, garbage collection and reallocation of memory (step 740) may be allowed to recycle the resources utilized by the detached frame instantiated by the Detach method back to the operating environment.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

APPENDIX A

Jukebox.java

```
/**
 * Jukebox.java          11/30/95          Behfar Razavi
 *
 * The Java Jukebox - a networked audio on demand applet.
 *
 * It can run as either a standalone application or as an applet.
 * It can run in any of several modes:
 *
 *    net:       Networked streamed audio on demand
 *    live:      Networked streamed live audio
 *    liveURL:   streamed live audio over a URL
 *    file:      Local audio files
 *    URL:       audio URL's
 *    stream:    audio URL's with scrolling
 *    URLstream: audio URL's with scrolling
 *
 * When in net or file mode, the jukebox creates VCR-type controls
 * that allow the user to stop, play, or rewind the audio stream or
 * to jump to a different selection.
 *
 * In net mode, an image - the CD cover - is optionally associated
 * with each audio selection and is displayed while that selection
 * is playing. For each selection, the Jukebox opens a TCP connection
 * to the audio server for controlling the media. User commands are
 * relayed to the server over the TCP connection while audio
 * data flows back to the applet over UDP.
 * The selection list, server, and port are provided as parameters
 * in the applet tag.
 *
 * In live mode, the user can only stop or start the stream and there
 * is no image.
 *
 * The Jukebox GUI consists of a media controller and a selection box.
 * The selection box displays the current selection and its associated
 * image if any. The controller provides VCR-type controls for a
 * MediaPlayer object.
 *
 * Underneath, the actual work is done by a "connection graph" of
 * fine-grained multimedia objects. The Jukebox interacts with
 * MediaPlayers which may in turn be NetAudioPlayers or AudioFilePlayers.
 */ import java.awt.*;
import java.io.*;
import java.util.*;
import java.net.*;
import java.applet.*;

import sunw.audio.*;

/*
 * Class Jukebox
 *
 * If the jukebox is invoked as an applet, it accepts the following parameters:
 * the only mandatory parameter is the selection parameter which defines
 * the audio selection. The rest have reasonable defaults.
 *
 *    selection - list of tracks and slides are in this format:
 *
 *                audio_file;title;image_file|audio_file;title;image_file|...
 *    -or-
 *                audio_file|audio_file|file;title|...
 *
 *                depending on whether images should be displayed or not.
 *
 *    config  - name of a configuration URL that contains all the
 *              options below. The format of the config file is
 *                optionname = "value"
 *
 *    server  - name of server host (has to match documentbase name
 *              to avoid security exceptions.)
 *
 *    port     - port number the audio server is listening on
 *    foreground - applet foreground color
 *    background - applet background color
 *    fontname   - applet font
 *    fontstyle  - applet font style
 *    fontsize   - applet font size
 *    slidewidth - slide width
 *    slideheight - slide height
 *    slidedir  - place where the slides reside on the server
 *    mediadir  - place where the audio resides on the server
 *    mediatype - one of:
 *                net, live, liveURL, file, memory, stream, URLstream, or URL
 *                (default is net)
 *    showslides - true or false for whether to show the images
 *
 * If the Jukebox is invoked as an application, it expects to retrieve
 * all these parameters through a configuration URL using the same format
 * as the config parameter above.
 * The Jukebox can also be invoked with a list of audio files on the
 * command line, in which case it will assume that it is operating in
 * file mode and plays the local audio files.
 */
public class Jukebox extends Applet implements Detachable {

JukeboxSelection selbox;         // controls the selection list
    JukeboxControl controller;       // VCR-type controls for the media
    Panel UIPanel;                   // place holder for UI components
    DetachedFrame detachedFrame;     // Frame for holding detached jukebox
    String tracks[];                 // names of audio tracks
    Image slides[];                  // corresponding images
    String titles[];                 // corresponding titles
    Image aboutImg;                  // image for about dialog
    Image iconImg;                   // image for iconified frame
    boolean isDetached = false;      // is the Jukebox detached?
    boolean isDetachable;            // is the Jukebox detachable?

String mediaDir = null;          // directory where media resides
    String slideDir = null;          // directory where slides reside
    String selection = null;         // list of media files
    String foreground = null;        // foreground color
    String background = null;        // background color
    String fontName = null;
    String fontStyle = null;
    String mediaType = null;
    boolean showSlides = true;
    int fontSize = 0;
    int slideHeight = 0;
    int slideWidth = 0;
    String server = null;            // name of the audio server host
    URL docBase = null;              // name of the server's base URL
    URL codeBase = null;             // name of the server's base URL
    int port = 0;
    final int JUKEBOX_PORT = 12300;  // default on-demand port
    final int LIVEAUDIO_PORT = 12000; // default live port
```

APPENDIX A

Jukebox.java

```java
/*
 * Used when the Jukebox is invoked as an applet
 */
public void init() {
    HTMLconfig();
    docBase = getDocumentBase();
    codeBase = getCodeBase();
    isDetachable = true;
    initialize();
}

/*
 * Used when the Jukebox is invoked as a standalone application
 */
public static void main(String argv[]) {
    if (argv.length < 1) {
        System.out.println("Usage: java Jukebox <url>|<files>");
        System.exit(1);
    }

Jukebox jukebox = new Jukebox();
    try {
        jukebox.docBase = new URL(argv[0]);
        jukebox.codeBase = null;
        jukebox.URLconfig(jukebox.docBase);
        jukebox.selection = "";
    } catch (MalformedURLException e) {
        for (int i = 0; i < argv.length; i++)
            jukebox.selection += argv[i] + "\n";
        jukebox.mediaType = "file";
        jukebox.showSlides = false;
    } jukebox.isDetachable = false;
    jukebox.initialize();

new DetachedFrame("Java Jukebox", jukebox,
                     jukebox.UIPanel, jukebox.iconImg);
}

/*
 * Get jukebox parameters from the applet html tag
 */
private void HTMLconfig() {
    /*
     * Get the server name and port number to connect to.
     */
    server = getParameter("server");
    try {
        port = Integer.parseInt(getParameter("port"));
    } catch (Exception e) { }
    /*
     * Get selection list and associated image names
     * followed by appearance parameters
     */
    mediaDir = getParameter("mediadir");
    mediaType = getParameter("mediatype");
    slideDir = getParameter("slidedir");
    selection = getParameter("selection");
    foreground = getParameter("foreground");
    background = getParameter("background");
    fontName = getParameter("fontname");
    fontStyle = getParameter("fontstyle");
    if (getParameter("showslides") != null)
        showSlides = getParameter("showslides").equals("true");
    try {
        fontSize = Integer.parseInt(getParameter("fontsize"));
    } catch (Exception e) { }
    try {
        slideHeight = Integer.parseInt(
                        getParameter("slideheight"));
    } catch (Exception e) { }
    try {
        slideWidth = Integer.parseInt(
                        getParameter("slidewidth"));
    } catch (Exception e) { }

String config = null;             // configuration URL name
    if ((config = getParameter("config")) != null) {
        try {
            URLconfig(new URL(getDocumentBase(), config));
        } catch (MalformedURLException e) {
            System.out.println("Unable to resolve "+config);
            System.out.println("Jukebox not configured");
        }
    }
}

/*
 * Get jukebox parameters from a URL
 */
private void URLconfig(URL configURL) {
    if (configURL == null)
        return;

StringTokenizer t1, t2;
    String text = "";
    Hashtable params = new Hashtable();

try {
        DataInputStream s;
        String inputLine;

s = new DataInputStream(configURL.openStream());

while ((inputLine = s.readLine()) != null) {
            text = text + inputLine;
        }
        s.close();
    } catch (Exception e) {
        System.out.println("Error loading config URL: ");
        e.printStackTrace();
        return;
    } t1 = new StringTokenizer(text, "\"");

while (t1.countTokens() >= 2) {
        String arg = t1.nextToken();
        String value = t1.nextToken();

t2 = new StringTokenizer(arg, " \n\r\t=");
        String paramName = t2.nextToken();
        params.put(paramName, value);
    } if (params.containsKey("server"))
        server = (String)params.get("server");
    if (params.containsKey("port"))
        try {
```

APPENDIX A

Jukebox.java

```java
            port = Integer.parseInt((String)params.get("port"));
        } catch (Exception e) { }
    if (params.containsKey("mediadir"))
        mediaDir = (String)params.get("mediadir");
    if (params.containsKey("mediatype"))
        mediaType = (String)params.get("mediatype");
    if (params.containsKey("slidedir"))
        slideDir = (String)params.get("slidedir");
    if (params.containsKey("showslides")) {
        String val = (String)params.get("showslides");
        showSlides = val.equals("true");
    }
    if (params.containsKey("selection"))
        selection = (String)params.get("selection");
    if (params.containsKey("foreground"))
        foreground = (String)params.get("foreground");
    if (params.containsKey("background"))
        background = (String)params.get("background");
    if (params.containsKey("fontname"))
        fontName = (String)params.get("fontname");
    if (params.containsKey("fontstyle"))
        fontStyle = (String)params.get("fontstyle");
    if (params.containsKey("fontsize"))
        try {
            fontSize = Integer.parseInt(
                    (String)params.get("fontsize"));
        } catch (Exception e) { }
    if (params.containsKey("slideheight"))
        try {
            slideHeight = Integer.parseInt(
                    (String)params.get("slideheight"));
        } catch (Exception e) { }
    if (params.containsKey("slidewidth"))
        try {
            slideWidth = Integer.parseInt(
                    (String)params.get("slidewidth"));
        } catch (Exception e) { }
} private void initialize() {
    String title = null;
    Toolkit tk = getToolkit();

/*
     * Set some defaults for missing parameters
     */
    if (mediaDir == null)
        mediaDir = "";
    if (mediaType == null)
        mediaType = "net";
    if (slideDir == null)
        slideDir = "";
    if (fontName == null)
        fontName = "TimesRoman";
    if (fontStyle == null)
        fontStyle = "plain";
    if (server == null)
        if (docBase != null)
            server = docBase.getHost();
        else
            server = "localhost";

if (fontSize == 0)
        fontSize = 12;
    if (slideHeight == 0)
        slideHeight = 200;
    if (slideWidth == 0)
        slideWidth = 200;

if (port == 0) {
        if (mediaType.equals("live") ||
                mediaType.equals("liveURL") )
            port = LIVEAUDIO_PORT;
        else if (mediaType.equals("net"))
            port = JUKEBOX_PORT;
    }

/*
     * The selection is in a string of the format
     *
     *    audio_file;title;image_file|
     * or:
     *    audio_file;title string|
     * or:
     *    title string
     *
     * depending on the media type.
     *
     * newlines, tabs, and spaces are ignored.
     */
    StringTokenizer t = new StringTokenizer(selection, "\n\r\t");
    if (mediaType.equals("live") || mediaType.equals("liveURL")) {
        title = t.nextToken();
    } else {
        tracks = new String[t.countTokens()];
        slides = new Image[t.countTokens()];
        titles = new String[t.countTokens()];
        for (int i = 0; t.hasMoreTokens(); i++) {
            String triple = t.nextToken().trim();
            int j = triple.indexOf(';');
            if (j == -1) {
                // no title or image was given
                tracks[i] = triple;
                titles[i] = triple;
                slides[i] = null;
                continue;
            }
            tracks[i] = triple.substring(0, j);
            int k = triple.indexOf(';', j+1);
            if (k == -1) {
                // no image was given
                titles[i] = triple.substring(j+1);
                slides[i] = null;
                continue;
            }
            titles[i] = triple.substring(j+1, k);
            try {
                slides[i] = tk.getImage(
                        new URL(docBase, slideDir+
                            triple.substring(k+1)));
            } catch (MalformedURLException e) {
                System.out.println("Unable to get: "+
                        slideDir+triple.substring(k+1));
            }
        } try {
```

APPENDIX A

Jukebox.java

```java
        aboutImg = tk.getImage(new
                URL(codeBase,"StreamInfo.class"));
        iconImg = tk.getImage(new
                URL(codeBase,"StreamHeader.class"));
    } catch (MalformedURLException e) {
        aboutImg = null;
        iconImg = null;
    }

/*
     * Construct the Selection box using the given
     * parameters
     */
    if (mediaType.equals("live") || mediaType.equals("liveURL")) {
        selbox = new JukeboxSelection(title);
    } else {
        if (showSlides)
            selbox = new JukeboxSelection(mediaDir, tracks,
                        titles, slides,
                        slideWidth,slideHeight);
        else
            selbox = new JukeboxSelection(mediaDir, tracks,
                        titles);
    }

/*
     * Construct the controller and pass the selection box
     * to it.
     */
    controller = new JukeboxControl(server, port, selbox,
                mediaType, this, docBase,
                isDetachable, aboutImg);

/*
     * Tell the selection box who is observing it
     */
    selbox.setObserver(controller);

/*
     * Layout the GUI components.  AWT sucks.
     */
    UIPanel = new Panel();
    UIPanel.setLayout(new BorderLayout());
    setColors(UIPanel, background, foreground);
    setColors(this, background, foreground);
    setFonts(UIPanel, fontName, fontStyle, fontSize);
    UIPanel.add("North", selbox);
    UIPanel.add("South", controller);
    add(UIPanel);
} public void start() {
    if (!isDetached)
        controller.resume();
} public void stop() {
    if (!isDetached)
        controller.pause();
} public void destroy() {
    if (isDetached)
        detachedFrame.close();
    controller.abort();
}
```

```java
}

/*
 * Detach the GUI and bring it up in a separate window
 * so that the user can control the jukebox separately
 * from the browser.
 */
public void detach() {
    isDetached = true;
    remove(UIPanel);
    detachedFrame = new DetachedFrame("Java Jukebox", this,
                UIPanel, iconImg);
    controller.makeAttachable();
}

/*
 * Attach the GUI back to the page in the browser.
 */
public void attach() {
    isDetached = false;
    detachedFrame.close();
    add(UIPanel);
    controller.makeDetachable();
    paintAll(getGraphics());
}

/*
 * stop the audio and
 * attach the GUI back to the page in the browser.
 */
public void close() {
    controller.stop();
    attach();
} public boolean isDetached() {
    return isDetached;
} private void setColors(Panel p, String background, String foreground) {
    Color c;

c = getColor(background);
    if (c != null) {
        p.setBackground(c);
    } c = getColor(foreground);
    if (c != null) {
        p.setForeground(c);
    }
} private Color getColor(String name) {
    if (name == null)
        return null;

if (name.equalsIgnoreCase("black"))
        return Color.black;
    else if (name.equalsIgnoreCase("blue"))
        return Color.blue;
    else if (name.equalsIgnoreCase("cyan"))
        return Color.cyan;
    else if (name.equalsIgnoreCase("darkGray"))
```

APPENDIX A

Jukebox.java

```
        return Color.darkGray;
    else if (name.equalsIgnoreCase("gray"))
        return Color.gray;
    else if (name.equalsIgnoreCase("green"))
        return Color.green;
    else if (name.equalsIgnoreCase("lightGray"))
        return Color.lightGray;
    else if (name.equalsIgnoreCase("magenta"))
        return Color.magenta;
    else if (name.equalsIgnoreCase("orange"))
        return Color.orange;
    else if (name.equalsIgnoreCase("pink"))
        return Color.pink;
    else if (name.equalsIgnoreCase("red"))
        return Color.red;
    else if (name.equalsIgnoreCase("white"))
        return Color.white;
    else if (name.equalsIgnoreCase("yellow"))
        return Color.yellow;
    else {
        StringTokenizer t = new StringTokenizer(name, ", ");
        if (t.countTokens() == 3) {
            try {
                int red   = Integer.parseInt(t.nextToken());
                int green = Integer.parseInt(t.nextToken());
                int blue  = Integer.parseInt(t.nextToken());
                return new Color(red, green, blue);
            } catch (Exception e) {
                return null;
            }
        }
        return null;
    }
} private void setFonts(Panel p, String name, String style, int size) {
    int fontStyle;

if (style.equalsIgnoreCase("italic"))
        fontStyle = Font.ITALIC;
    else if (style.equalsIgnoreCase("bold"))
        fontStyle = Font.BOLD;
    else if (style.equalsIgnoreCase("bolditalic"))
        fontStyle = Font.BOLD + Font.ITALIC;
    else
        fontStyle = Font.PLAIN;
    p.setFont(new Font(name, fontStyle, size));
}
```

APPENDIX B

DetachedFrame.java

```java
/**
 * ================================================
 * Class DetachedFrame
 *
 * A frame for holding a Detachable object in a separate window
 */
import java.awt.*;

public class DetachedFrame extends Frame {
    Detachable detachable;

public DetachedFrame(String title, Detachable d, Component c, Image img) {
        detachable = d;
        setTitle(title);

if (img != null) {
            Toolkit tk = getToolkit();
            for (int i = 0; i < 4; i++) {
                if (tk.prepareImage(img, -1, -1, this))
                    break;
                else
                    try { Thread.sleep(500);
                    } catch (Exception e) {
                        break;
                    }
            }
            setIconImage(img);
        }

Panel p = new Panel();
        p.add(c);
        p.setBackground(c.getBackground());
        p.setForeground(c.getForeground());

setLayout(new BorderLayout());
        add("Center", p);
        pack();
        show();
    }

// properly dispose of the UI components and close the window
    public void close() {
        hide();
        dispose();
    }

// close the window and abort if the user closes the window
    public boolean handleEvent(Event e) {
        if (e.id == Event.WINDOW_DESTROY) {
            detachable.close();
            hide();
            dispose();
            return true;
        }
        return false;
    }
}
```

What is claimed is:

1. A process comprising:

implementing a detachable interface to enable an applet to become free of graphical user interface (GUI) constraints imposed by an application that spawned said applet; and modifying a non-detachable applet to become a detachable applet, said detachable applet capable of being manipulated on a desktop by interaction with an operating environment.

2. A process according to claim 1 wherein the implementing comprises:

modifying the class definition of said non-detachable applet to include a detachable interface.

3. A process according to claim 2 wherein the modifying comprises:

adding a set of generic methods for implementing said detachable interface.

4. A process according to claim 3 further comprising:

modifying any of said set of generic methods to suit the desired look-and-feel of said detachable applet.

5. A process according to step 3 wherein said adding comprises:

adding a first method for placing said detachable applet into a detached state; and adding a second method for placing said detachable applet if in the detached state back to an attached state.

6. A process according to claim 5 further comprising:

adding a third method for toggling between said states.

7. A process according to claim 5 further comprising:

adding a fourth method for disposing completely said detachable applet while in the detached state.

8. A process for controlling the behavior of an applet exclusive of application constraints comprising:

detaching said applet from said application, said applet continuing to utilize a virtual machine of said application to execute applet instructions;

displaying a detached window to render visually said applet; and enabling the modification of visual properties of said detached window.

9. A process according to claim 8 wherein the detaching comprises:

activating a user interface element to detach applet while graphically constrained by said application; and calling a Detach method for executing a set of instructions pursuant to completing said steps of detaching, displaying and enabling.

10. A process according to claim 8 further comprising attaching said applet into said application.

11. A process according to claim 10 wherein the attaching comprises:

calling an Attach method;

closing said detached window; and redrawing said applet into said application.

12. A process according to claim 9 wherein the calling a Detach method initiates:

instantiating a new frame;

removing components of said applet from said application;

adding said removed components to said new frame;

mapping said detached window onto a display device; and painting said added components onto said display device, said painting to occur within the mapped detached window.

13. A graphical user interface system for controlling an applet comprising:

a desktop defined by an operating environment;

an application window visually displayed as an overlay on said desktop, said application window displaying and visually constraining said applet while said applet is in an attached state; and a detached window running directly over said desktop, said detached window being displayed on said desktop only while said applet is in a detached state, said detached state removing said applet from being visually constrained and displayed in said application window, wherein said applet is a platform-independent program that is executable by a virtual machine.

14. A graphical user interface system according to claim 13 wherein said detached window includes a user interface element for enabling said applet to be placed in the attached state.

15. A graphical user interface system according to claim 14 wherein said application window includes a user interface element for enabling said applet to be placed in the detached state.

16. A graphical user interface according to claim 14 wherein said detached window is closed when said applet is placed in the attached state.

17. A graphical user interface system according to claim 13 wherein said applet is launched initially in the attached state.

18. A graphical user interface system according to claim 13 wherein said applet is launched initially in the detached state.

19. A computer-readable medium having stored thereon applet code interpretable by an application, said applet code including sequences of instructions which, when executed by a processor, cause said processor to perform:

detaching said applet from said application, said applet continuing to utilize a virtual machine of said application to facilitate execution of said sequence of instructions by said processor;

displaying a detached window to render visually said detached applet; and enabling the modification of visual properties of said detached window.

20. A computer software product having applet code interpretable by an application, said computer software product distributed to a processor, said applet code including sequences of instructions which, when executed by said processor, cause said processor to perform:

detaching said applet from said application, said applet continuing to utilize a virtual machine of said application to facilitate execution of said sequence of instructions by said processor;

displaying a detached window to render visually said detached applet; and enabling the modification of visual properties of said detached window.

* * * * *